H. M. HANNA, Jr., H. E. WETHERBEE & R. F. GRANT.
SPRING WHEEL.
APPLICATION FILED SEPT. 23, 1910.
1,032,001.
Patented July 9, 1912.
2 SHEETS—SHEET 1.
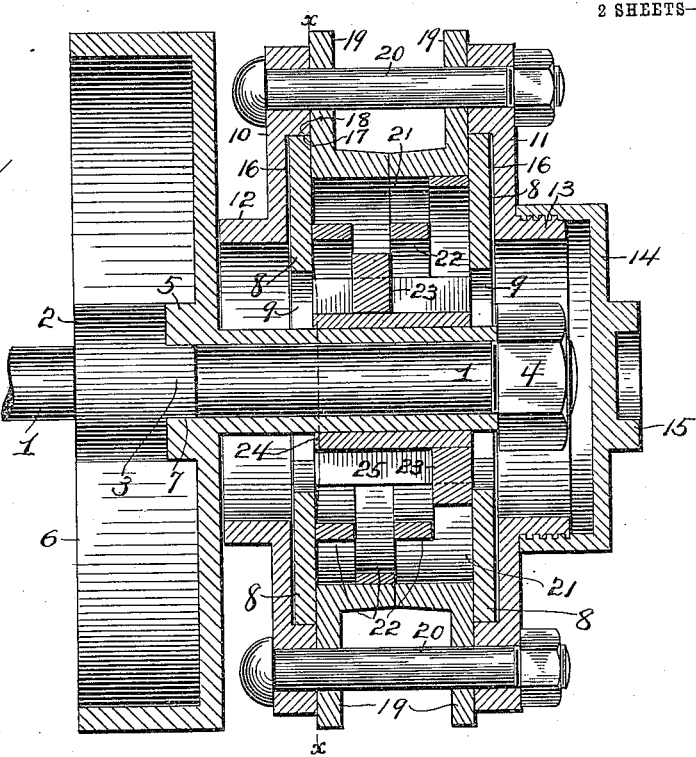
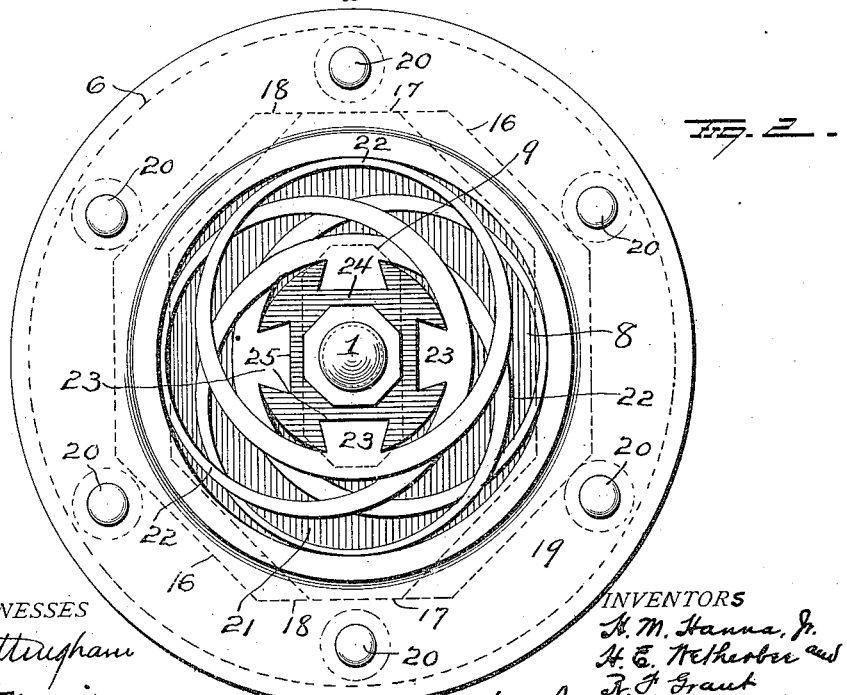

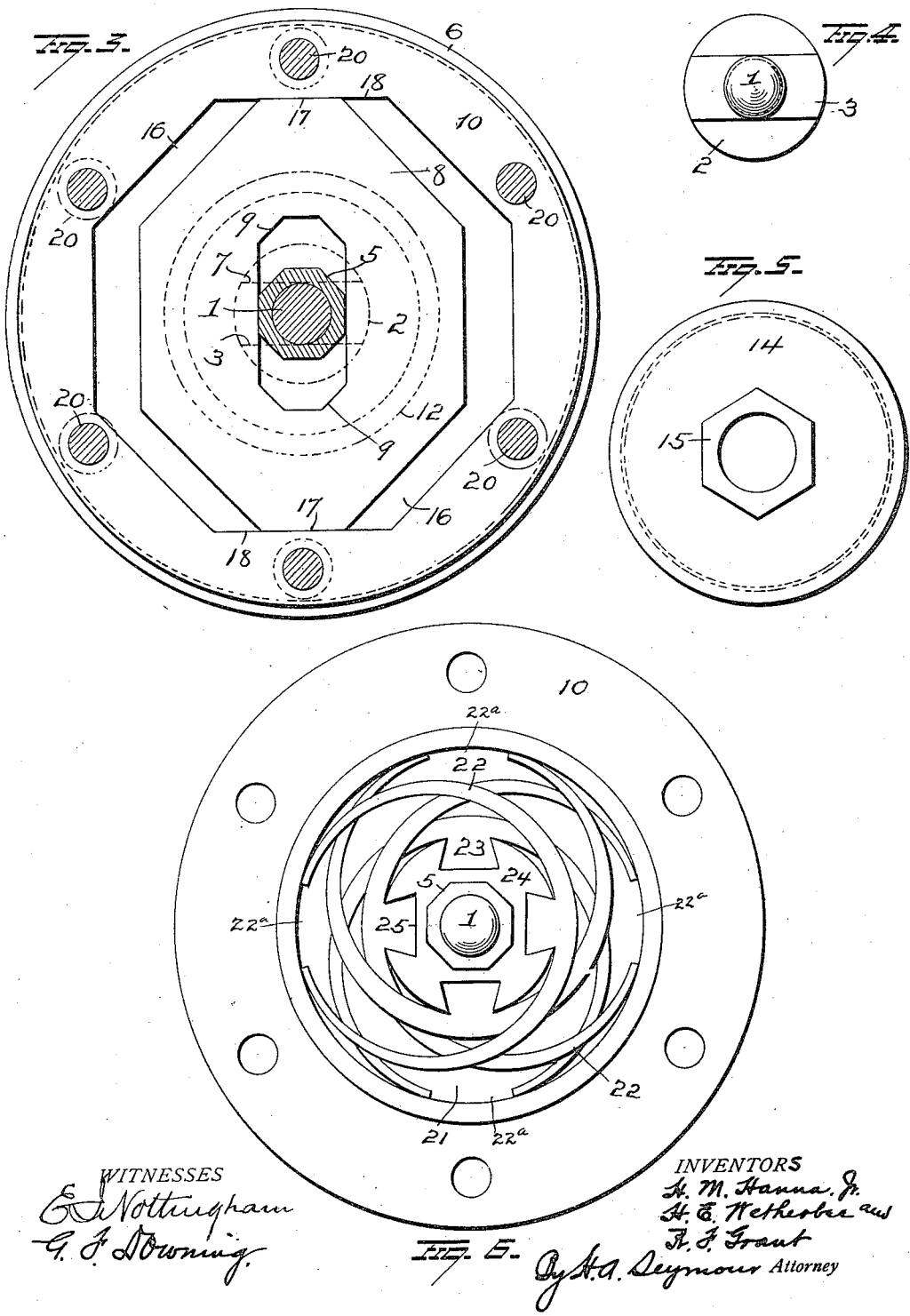

UNITED STATES PATENT OFFICE.

HOWARD M. HANNA, JR., HERBERT E. WETHERBEE, AND RICHARD F. GRANT, OF CLEVELAND, OHIO.

SPRING-WHEEL.

1,032,001.    Specification of Letters Patent.    Patented July 9, 1912.

Application filed September 23, 1910. Serial No. 583,507.

*To all whom it may concern:*

Be it known that we, HOWARD M. HANNA, Jr., HERBERT E. WETHERBEE, and RICHARD F. GRANT, of Cleveland, in the county of Cuyahoga and State of Ohio, have invented certain new and useful Improvements in Spring-Wheels, and do hereby declare the following to be a full, clear, and exact description of the invention, such as will enable others skilled in the art to which it appertains to make and use the same.

This invention relates to improvements in spring wheels, and more particularly to that type in which the springs are located in the hub-portion of the wheel,—one object of the invention being to provide a wheel in which the springs shall be flexible under slight compression but stiff under heavy compression.

A further object is to provide a simple and efficient construction in a spring wheel, which will operate in such manner that, as the wheel turns, the weight of the vehicle will keep the axle continuously slightly below the center of the wheel and thereby cause a resilient action.

With these objects in view the invention consists in certain novel features of construction and combinations of parts as hereinafter set forth and pointed out in the claims.

In the accompanying drawings, Figure 1 is a sectional view illustrating the hub-portion of a wheel embodying our improvements. Fig. 2 is a side elevation with parts removed to expose to view the springs and their connection with the axle. Fig. 3 is a view on the line *x—x* of Fig. 1. Figs. 4 and 5 are detail views, and Fig. 6 shows a modification.

1 represents an axle provided with an integral collar 2 having an elongated enlargement 3 and at its free end the axle is threaded for the reception of a nut 4. The sleeve or hub-portion 5 of a brake wheel 6 is mounted on the axle 1 and provided at one end in the center of said brake-wheel with an elongated recess or slot 7 for the reception of the elongated portion 3 of collar 2, whereby the brake-wheel is secured to rotate with the axle. The sleeve 5 is made with an angular exterior, preferably octagonal in cross section, as shown in Fig. 3 and serves as a guide for two plates 8—8, the latter being spaced apart as shown in Fig. 1 and provided with elongated slots 9, the diametrically opposite walls of each of which engage parallel faces of the octagonal sleeve 5.

Located adjacent to the plates 8 are rings 10—11, the ring 10 being provided at its inner edge with an annular flange 12, the free edge of which bears against the brake-wheel 6. The ring 11 is provided at its inner edge with an outwardly projecting flange 13 which is threaded exteriorly for the reception of threads in the flange of a cap or cover 14 which incloses the free end of the axle and the nut 4 thereon. This cap or cover is provided with a suitable annular enlargement 15 for the reception of a suitable wrench. The plates 10 and 11 are recessed as shown at 16 and these recesses are preferably made octagonal in shape, as shown in Fig. 3, and receive the plates 8. Each plate 8 is also made octagonal in shape but has one of its diameters appreciably shorter than the diameter of the recess 16. The other diameter of each plate 8 is approximately equal to the diameter of the recess 16 into which it enters. Thus each plate 8 is provided at diametrically opposite points with short bearing faces 17 which engage and are movable against bearing faces 18 afforded by diametrically opposite portions of the walls of the recesses 16 in plates 10 and 11. Two rings 19, L-shaped in cross section are located between the outer portions of the plates 10 and 11 and coöperate to form a hub-rim into which the wheel spokes project. The rings 19 are so disposed that they project inwardly beyond the outer edges of the plates 8 so that the latter will be confined between said rings 19 and the inner portions of the rings 10—11. The rings 10—11 and the rings 19 are secured in position by means of bolts 20 which pass transversely through said rings as clearly shown in Fig. 1.

It will be observed that the plates 8 and rings 19 form a chamber 21 around the sleeve 5 on the axle and in this chamber, four springs 22 are located. Each spring 22 is made circular in form and provided with a dovetailed lug 23, the metal of the spring gradually diminishing in size from respective sides of said lug to the portion of the spring diametrically opposite said lug. A spring carrier 24 is located on the octagonal sleeve 5 within the chamber 21 and provided with a series of dovetailed recesses or sockets 25 for the reception of the dovetailed lugs in the springs and thus the springs are connected with the axle. The circular springs are so disposed within the chamber 21 that the respective springs of each pair bear against the rings 19 at diametrically opposite points,—the bearings of one pair of springs against the rings 19 being at right angles to the bearings of the other pair of springs against said rings.

With the construction and arrangement of parts above described, the weight of the vehicle will cause the axle to be maintained always slightly below the center of the wheel and therefore, during the rotation of the wheel, as the vehicle travels forwardly, the springs will be brought successively under tension and hence the resiliency of the wheel will be enhanced. In action, as the springs are compressed, the bearing points are brought closer together so that the springs become shorter and stiffer and while said springs become quite stiff under heavy compression they will be quite flexible under slight compression. It will be observed that no matter what direction the compression takes there will always be three out of the four springs in action. The circular springs may have sections of their thin bearing portions removed as at 22ª, Fig. 6.

Various slight changes might be made in the details of construction of our invention without departing from the spirit thereof or limiting its scope and hence we do not wish to restrict ourselves to the precise details herein set forth.

Having fully described our invention what we claim as new and desire to secure by Letters-Patent, is,—

1. In a spring wheel, the combination with an axle sleeve and a hollow hub, of plates disposed in said hollow hub and having elongated slots through which the axle sleeve passes, said plates being freely movable within the hollow hub in a direction at right angles to the elongated slots in said plates, and a plurality of circular springs secured to the axle sleeve said springs being free except where they are secured to the axle sleeve and having free bearings at four equi-distant points against the peripheral portion of said hollow hub.

2. In a spring wheel, the combination with an axle and a hollow hub, of a carrier secured to the axle, four circular springs encircling the axle and having free bearings at their peripheral portions against the peripheral portion of the hub at equi-distant points, and means securing each spring to the axle diametrically opposite the free bearing of said spring against the peripheral portion of the hub.

3. In a spring wheel, the combination with a hollow hub and an axle, of a plurality of circular springs encircling the axle and having free bearings at their peripheral portions against the peripheral portion of the hub, two of said circular springs being disposed at right angles to two other of said circular springs, a carrier on the axle to which said springs are secured, and means movable in two directions at right angles to each other for guiding the compression of said springs.

4. In a spring wheel, the combination with an axle and a hollow hub, of a plurality of circular springs encircling the axle and having free bearings against the peripheral portion of the hollow hub, each circular spring having an inwardly-projecting dove-tail lug, and a carrier on the axle, said carrier passing through all of said circular springs and having dove-tail recesses in which the inwardly projecting dove-tail lugs in the springs are seated.

5. In a spring wheel, the combination with a hollow hub and an axle, of two pairs of circular springs encircling the axle and disposed at right angles to each other, fastening means between said springs and the axle, said springs having free bearings against the peripheral portion of the hub at four equi-distant points, and means for guiding the compression of each pair of springs at right angles to each other.

6. In a spring wheel, the combination with an axle sleeve having an angular exterior, of two plates having elongated slots to receive said sleeve, rings having recesses in which said plates are movable in a direction at right angles to the slot in said plates, an annular hub-portion secured between said rings and coöperating with the latter to guide said plates, and a series of springs connected with the axle sleeve between said plates and having free bearings at four equi-distant points bearing against the annular hub-portion.

7. In a spring wheel, the combination with an axle sleeve having an angular exterior, of two plates having elongated slots to receive said axle sleeve, rings in which the plates are movable, two L-shaped rings secured between the first mentioned rings and said plates and coöperating to form an annular hub member, a spring carrier on the axle sleeve, and a series of circular springs disposed between said plates and bearing against the L-shaped rings, each of said circular springs being connected at a point diametrically opposite its bearing on an L-shaped ring, with the spring carrier.

In testimony whereof, we have signed this specification in the presence of two subscribing witnesses.

HOWARD M. HANNA, Jr.
HERBERT E. WETHERBEE.
RICHARD F. GRANT.

Witnesses:
P. A. CLAPPER,
SAM W. FOLSOM.

Copies of this patent may be obtained for five cents each, by addressing the "Commissioner of Patents, Washington, D. C."